US011651150B2

(12) United States Patent
Paliwal et al.

(10) Patent No.: US 11,651,150 B2
(45) Date of Patent: May 16, 2023

(54) DEEP LEARNING BASED TABLE DETECTION AND ASSOCIATED DATA EXTRACTION FROM SCANNED IMAGE DOCUMENTS

(71) Applicant: Tata Consultancy Services Limited, Mumbai (IN)

(72) Inventors: Shubham Singh Paliwal, Gurgaon (IN); Vishwanath Doreswamy Gowda, Gurgaon (IN); Rohit Rahul, Gurgaon (IN); Monika Sharma, Gurgaon (IN); Lovekesh Vig, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/594,250

(22) PCT Filed: Mar. 9, 2020

(86) PCT No.: PCT/IN2020/050218
§ 371 (c)(1),
(2) Date: Oct. 7, 2021

(87) PCT Pub. No.: WO2021/053687
PCT Pub. Date: Mar. 25, 2021

(65) Prior Publication Data
US 2022/0319217 A1     Oct. 6, 2022

(30) Foreign Application Priority Data

Sep. 18, 2019   (IN) .............................. 201921037651

(51) Int. Cl.
*G06F 40/177*     (2020.01)
*G06V 30/18*      (2022.01)
(Continued)

(52) U.S. Cl.
CPC ............ *G06F 40/177* (2020.01); *G06V 10/82* (2022.01); *G06V 30/18057* (2022.01);
(Continued)

(58) Field of Classification Search
CPC .... G06V 30/10; G06V 30/274; G06V 30/414; G06V 30/18057; G06V 10/82; G06F 40/177
See application file for complete search history.

(56) References Cited

U.S. PATENT DOCUMENTS

2007/0140565 A1    6/2007   Lin et al.
2013/0343658 A1   12/2013   Dejean
(Continued)

FOREIGN PATENT DOCUMENTS

CN    109522816        7/2021
WO    WO2018175686     9/2018

OTHER PUBLICATIONS

Author: Minghao Li, Lei Cui, Shaohan Huang, Furu Wei, Ming Zhou, and Zhoujun Li Title: TableBank: Table Benchmark for Image-based Table Detection and Recognition Title of the item: Computer Vision and Pattern Recognition g Date: Jul. 2020 Publisher: Arxiv Link: https://arxiv.org/pdf/1806.04655.pdf.
(Continued)

*Primary Examiner* — Daniel G Mariam
(74) *Attorney, Agent, or Firm* — Finnegan, Henderson, Farabow, Garrett & Dunner LLP

(57) ABSTRACT

The need for extracting information trapped in unstructured document images is becoming more acute. A major hurdle to this objective is that these images often contain information in the form of tables and extracting data from tabular sub-images presents a unique set of challenges. Embodiments of the present disclosure provide systems and methods that implement a deep learning network for both table
(Continued)

detection and structure recognition, wherein interdependence between table detection and table structure recognition are exploited to segment out the table and column regions. This is followed by semantic rule-based row extraction from the identified tabular sub-regions.

12 Claims, 9 Drawing Sheets

(51) Int. Cl.
- *G06V 10/82* (2022.01)
- *G06V 30/262* (2022.01)
- *G06V 30/414* (2022.01)
- *G06V 30/10* (2022.01)

(52) U.S. Cl.
CPC .......... *G06V 30/274* (2022.01); *G06V 30/414* (2022.01); *G06V 30/10* (2022.01)

(56) References Cited

U.S. PATENT DOCUMENTS

| | | |
|---|---|---|
| 2016/0117551 A1 | 4/2016 | Hausmann et al. |
| 2019/0026550 A1* | 1/2019 | Yang ................ G06V 30/19147 |
| 2019/0171704 A1 | 6/2019 | Buisson et al. |
| 2019/0303663 A1* | 10/2019 | Krishnapura Subbaraya .............. G06V 30/412 |

OTHER PUBLICATIONS

Author: Nikola Milosevic Title: A Multi-Layered Approach to Information Extraction From Tables in Biomedical Documents Title of the item: Computer Science Date: 2018 Publisher: Manchester Link: https://www.research.manchester.ac.uk/portal/files/70405100/FULL_TEXT.PDF.

Author: Sebastian Schreiber*‡, Stefan Agne‡, Ivo Wolf*, Andreas Dengel†‡, Sheraz Ahmed Title: Deepdesrt: Deep learning for detection and structure recognition of tables in document images Title of the item: IAPR International Conference on Document Analysis and Recognition (ICDAR) Date: Nov. 2017 Publisher: IEEE.

Author: Jing Fang; Xin Tao; Zhi Tang; Ruiheng Qiu; Ying Liu Title: Dataset ground-truth and performance metrics for table detection evaluation Title of the item: IAPR International Workshop on Document Analysis Systems Date: Mar. 2012 Publisher: IEEE Link: http://www.ict.griffith.edu.au/das2012/attachments/FullPaperProceedings/4661a445.pdf.

Göbel et al. "Icdar 2013 table competition." In 2013 12th International Conference on Document Analysis and Recognition. Aug. 28, 2013 (Aug. 28, 2013) Retrieved on Jul. 29, 2020 (Jul. 29, 2020) from http://www.orsigiorgio.net/wp-content/papercite-data/pdf/gho13.pdf entire document.

Guyon et al. "Data sets for OCR and document image understanding research." In: Handbook of character recognition and document image analysis. 1997 (1997) Retrieved on Jul. 29, 2020 (Jul. 29, 2020) from http://www.haralick.org/conferences/guyon_97.pdf entire document.

International Search Report for PCT/IN2020/050218 dated Aug. 14, 2020.

Written Opinion of the International Search Authority for PCT/IN2020/050218 dated Aug. 14, 2020.

* cited by examiner

| Heuristics | 250 clauses | 300 clauses |
|---|---|---|
| None | 9204 | 2583 |
| Over | 8542 | 2388 |
| Positive | 302 | 429 |
| Both | 303 | 424 |

Table 1: Comparison between different heuristics, 100 variables, all minimized.

FIG. 4A

| Heuristics | 230 clauses | 300 clauses |
|---|---|---|
| None | 1710 | 2583 |
| Over | 1412 | 2483 |
| Positive | 307 | 320 |
| Com | 306 | 270 |

Table 0 Comparison between different heuristics 100 variables all minimized

FIG. 4B

| Heuristics | 200 clauses | 300 clauses |
|---|---|---|
| None | 9204 | 25583 |
| Over | 8542 | 23588 |
| Positive | 3802 | 490 |
| Both | 3893 | 492 |

Table 1: Comparison between different heuristics, 100 variables, all minimized

FIG. 4D

| Heuristics | 250 clauses | 500 clauses |
|---|---|---|
| None | 9204 | 25883 |
| Over | 8542 | 23886 |
| Positive | 3002 | 420 |
| Both | 3003 | 424 |

Table 1: Comparison between different heuristics, 100 variables, all minimized.

FIG. 4G

DEEP LEARNING BASED TABLE DETECTION AND ASSOCIATED DATA EXTRACTION FROM SCANNED IMAGE DOCUMENTS

CROSS REFERENCE TO RELATED PATENT APPLICATIONS AND PRIORITY

This present application is a U.S. National Stage Filing under 35 U.S.C. § 371 and claims priority from International Application No. PCT/IN2020/050218 filed on Mar. 9, 2020, which application claims priority under 35 U.S.C. § 119 from India Application No. 201921037651, filed on Sep. 18, 2019. The entire contents of the aforementioned applications are incorporated herein by reference.

TECHNICAL FIELD

The disclosure herein generally relates to deep learning networks, and, more particularly, to deep learning based table detection and associated data extraction from scanned image documents.

BACKGROUND

With the widespread use of mobile phones and scanners to photograph documents, the need for extracting the information trapped in unstructured document images such as retail receipts, insurance claim forms and financial invoices is becoming more acute. A major hurdle to this objective is that these images often contain information in the form of tables and extracting data from tabular sub-images presents a unique set of challenges. This includes accurate detection of the tabular region within an image, and subsequently detecting and extracting information from the rows and columns of the detected table. While some progress has been made in table detection, extracting the table contents is still a challenge since this involves table structure (rows and columns) recognition.

SUMMARY

Embodiments of the present disclosure present technological improvements as solutions to one or more of the above-mentioned technical problems recognized by the inventors in conventional systems. For example, in one aspect, there is provided a processor implemented method for table detection and associated data extraction from scanned image documents using a deep learning network. The method comprises receiving, via one or more hardware processors, a scanned image document comprising one or more tables and text; extracting and highlighting, via the one or more hardware processors, at least one of one or more non-numerical values and one or more numerical values from the one or more tables and associated text, using a text detection and recognition technique; inputting, via the one or more hardware processors, the extracted and highlighted non-numerical and numerical values being appended in the scanned image document, to the deep learning network to obtain a set of learnt features; generating, via the one or more hardware processors, a masked table region and one or more masked column regions using the set of learnt features; applying, via the one or more hardware processors, one or more domain-based rules on the masked table region to obtain one or more rows; and identifying, via the one or more hardware processors, tuples in the one or more tables based on one or more columns from the masked column regions and the one or more obtained rows from the masked table region.

In an embodiment, the step of extracting and highlighting at least one of one or more non-numerical values and one or more numerical values from the one or more tables and associated text, using a text detection and recognition technique, is based on identified semantic information using the text from the scanned image document.

In an embodiment, the masked table region and the one or more masked column regions are generated to determine boundary of the one or more columns and the one or more tables comprised in the scanned image document.

In an embodiment, the step of identifying tuples in the one or more tables is based on an intersection of the one or more columns from the masked column regions and the one or more obtained rows in the masked table region.

In another aspect, there is provided a system for deep learning based table detection and associated data extraction from scanned image documents using a deep learning network. The system comprises: a memory storing instructions; one or more communication interfaces; and one or more hardware processors coupled to the memory via the one or more communication interfaces, wherein the one or more hardware processors are configured by the instructions to: receive, via one or more hardware processors, a scanned image document comprising one or more tables and text; extract and highlight, via the one or more hardware processors, at least one of one or more non-numerical values and one or more numerical values from the one or more tables and associated text, using a text detection and recognition technique; input, via the one or more hardware processors, the extracted and highlighted non-numerical and numerical values to a deep learning network comprised in the system to obtain a set of learnt features; generate, via the one or more hardware processors, a masked table region and one or more masked column regions using the set of learnt features; apply, via the one or more hardware processors, one or more domain-based rules on the masked table region to obtain one or more rows; and identify, via the one or more hardware processors, tuples in the one or more tables based on one or more columns from the masked column regions and the one or more obtained rows from the masked table region.

In an embodiment, at least one of one or more non-numerical values and one or more numerical values are extracted and highlighted from the one or more tables and associated text, using the text detection and recognition technique, is based on identified semantic information using the text from the scanned image document.

In an embodiment, the masked table region and the one or more masked column regions are generated to determine boundary of the one or more columns and the one or more tables comprised in the scanned image document.

In an embodiment, the step of identifying tuples in the one or more tables is based on an intersection of the one or more columns from the masked column regions and the one or more obtained rows in the masked table region.

In yet another aspect, there are provided one or more non-transitory machine readable information storage mediums comprising one or more instructions which when executed by one or more hardware processors cause deep learning based table detection and associated data extraction from scanned image documents by receiving, via the one or more hardware processors, a scanned image document comprising one or more tables and text; extracting and highlighting, via the one or more hardware processors, at least one of one or more non-numerical values and one or more numerical values from the one or more tables and associated text, using a text detection and recognition technique; inputting, via the one or more hardware processors, the extracted and highlighted non-numerical and numerical values to the deep learning network to obtain a set of learnt features; generating, via the one or more hardware processors, a masked table region and one or more masked column regions using the set of learnt features; applying, via the one or more hardware processors, one or more domain-based rules on the masked table region to obtain one or more rows; and identifying, via the one or more hardware processors, tuples in the one or more tables based on one or more columns from the masked column regions and the one or more obtained rows from the masked table region.

In an embodiment, the step of extracting and highlighting at least one of one or more non-numerical values and one or more numerical values from the one or more tables and associated text, using a text detection and recognition technique, is based on identified semantic information using the text from the scanned image document.

In an embodiment, the masked table region and the one or more masked column regions are generated to determine boundary of the one or more columns and the one or more tables comprised in the scanned image document.

In an embodiment, the step of identifying tuples in the one or more tables is based on an intersection of the one or more columns from the masked column regions and the one or more obtained rows in the masked table region.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4A depicts a sample input scanned image document, in accordance with an embodiment of the present disclosure.

FIG. 4B depicts detection of words regions using the text recognition technique, wherein text are extracted and highlighted and region is created on basis of text content in accordance with an embodiment of the present disclosure.

FIG. 4D depicts a modified dataset, with masked content and/or text of FIG. 3 appended to the modified dataset, in accordance with an embodiment of the present disclosure.

FIG. 4G depicts boundary of columns and table(s) comprised in the input scanned image document in accordance with an embodiment of the present disclosure.

DETAILED DESCRIPTION

Figure 1:
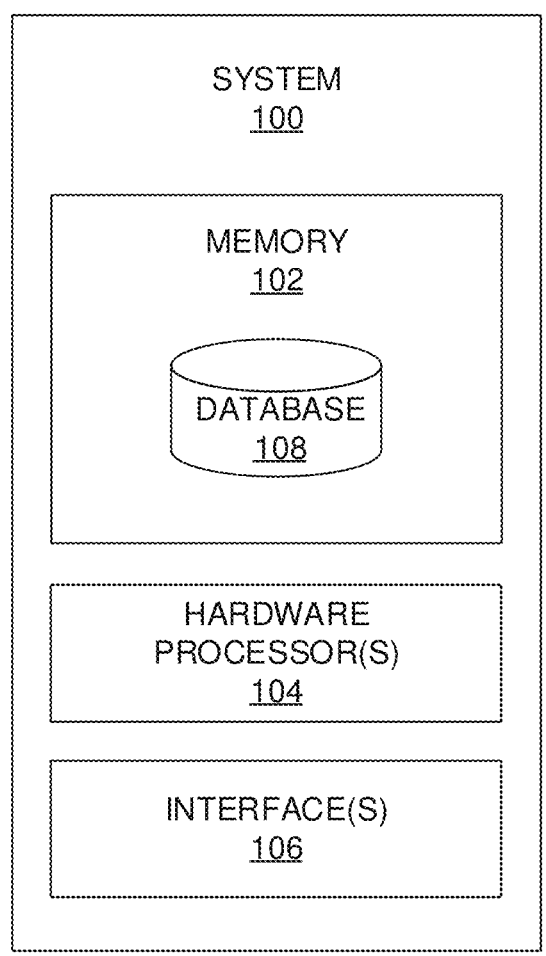
FIG. 1 an exemplary block diagram of a system for deep learning based table detection and associated data extraction from scanned image documents, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

With the proliferation of mobile devices equipped with cameras, increasingly more customers are uploading documents via these devices, making the need for information extraction from these images more pressing. Currently, these document images are often manually processed resulting in high labour costs and inefficient data processing times. In addition, these documents often contain data stored in tables with multiple variations in layout and visual appearance. A key component of information extraction from these documents therefore involves digitizing the data present in these tabular sub-images. The variation in the table structure, and in the graphical elements used to visually separate the tabular components make extraction from these images a very challenging problem. Most existing approaches to tabular information extraction divide the problem into the two separate sub-problems of 1) table detection and 2) table structure recognition, and attempt to solve each sub-problem independently. While table detection involves detection of the image pixel coordinates containing the tabular sub-image, tabular structure recognition involves segmentation of the individual rows and columns in the detected table.

In the present disclosure, systems and methods and embodiments associated thereof implement an end-to-end deep learning model/network that exploits the inherent inter-dependence between the twin tasks of table detection and table structure identification. The model utilizes a base network that is initialized with pre-trained VGG-19 features. This is followed by two decoder branches for 1) Segmentation of the table region and 2) Segmentation of the columns within a table region. Subsequently, rule based row extraction is employed to extract data in individual table cells.

A multi-task approach is used for the training of the deep model. The model takes a single input image and produces two different semantically labelled output images for tables and columns. The model shares the encoding layer of VGG-19 for both the table and column detectors, while the decoders for the two tasks are different. The shared common layers are repeatedly trained from the gradients received from both the table and column detectors while the decoders are trained independently. Semantic information about elementary data types is then utilized to further boost model performance. The utilization of the VGG-19 as a base network, which is pre-trained on the ImageNet dataset allows for exploitation of prior knowledge in the form of low-level features learnt via training over ImageNet.

The present disclosure has also evaluated TableNet's (or model of the present disclosure) performance on the ICDAR-2013 dataset, demonstrating that method of the present disclosure outperforms other deep models as well as other state-of-the art methods in detecting and extracting tabular information in image documents. The present disclosure further demonstrates that the model can generalize to other datasets with minimal fine-tuning, thereby enabling transfer learning. Furthermore, the Marmot dataset which has previously been annotated for table detection was also manually annotated for column detection, and these new annotations can be further utilized.

There is significant prior work on identifying and extracting the tabular data inside a document. Before the advent of deep learning, most of the work on table detection was based on heuristics or metadata. For instance, one of the prior research work exploited the structural information to identify tables and their component fields, while other research work used hierarchical representations based on the MXY tree for table detection and was the first attempt at using Machine Learning techniques for this problem. Yet another research work identified intersecting horizontal, vertical lines and low-level features and used an SVM classifier to classify an image region as a table region or not. Probabilistic graphical models were also used to detect tables; wherein joint probability distribution was modeled over sequential observations of visual page elements and the hidden state of a line (HMM) to join potential table lines into tables resulted in a high degree of completeness. Yet further research work used table header as the starting point to detect the table region and decompose its elements. Yet another research work made an attempt to detect borderless tables. They utilized whitespaces as a heuristic rather than content for detection.

In all prior deep learning based works, table detection and column detection are considered as two different problems, which can be solved independently. However, intuitively if all the columns present in a document are known apriori, the table region can be determined easily. But by definition, columns are vertically aligned word/numerical blocks. Thus, independently searching for columns can produce a lot of false positives. Thus, knowledge of the tabular region can greatly improve results for column detection. Since both tables and columns have common regions. Therefore, if convolutional filters utilized to detect table, can be reinforced by column detecting filters, this should significantly improve the performance of the model.

The model as implemented by the present disclosure is based encoder-decoder model for semantic segmentation. The encoder of the model is common across both tasks, but the decoder emerges as two different branches for tables and columns. Concretely, encoding layers have been enforced by the present disclosure and its systems and methods to use the ground truth of both tables and columns of document for training. However, the decoding layers are separated for table and column branches. Thus, there are two computational graphs to train.

The input image for the model of the present disclosure, is first transformed into RGB image and then, resized to for example say, 1024*1024 resolution. This modified image is processed using tesseract OCR (optical character recognition) technique as described and known in the art. Since a single model produces both the output masks for the table and column regions, these two independent outputs have binary target pixel values, depending on whether the pixel region belongs to the table/column region or background respectively.

Figure 2:
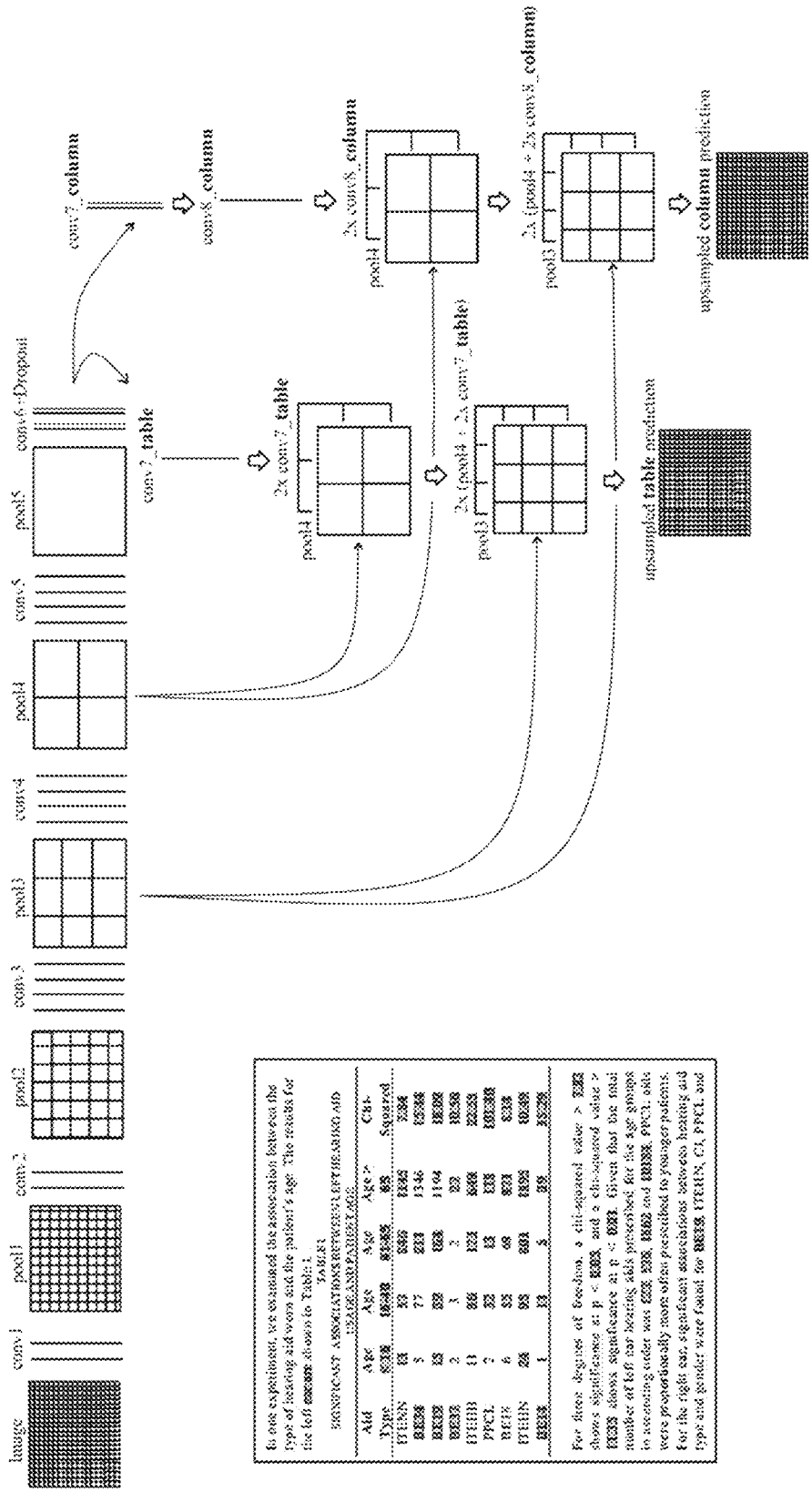
FIG. 2 depicts an exemplary deep learning network comprised in the system of FIG. 1 for table detection and associated data extraction from scanned image documents along with a modified dataset, in accordance with an embodiment of the present disclosure.

The problem of detecting tables in documents is similar to the problem of detecting objects in real world images. Similar to the generic object detection problem, visual features of the tables can be used to detect tables and columns. The difference is that the tolerance for noise in table/column detection is much smaller than in object detection. Therefore, instead of regressing for the boundaries of tables and columns, the method of the present disclosure is implemented to predict table and column regions pixel-wise. Recent research work on semantic segmentation has been based on pixel wise prediction. In the recent research work, fully convolution network (FCN) architecture has demonstrated the accuracy of encoder-decoder network architectures for semantic segmentation. The FCN architecture uses the skip-pooling technique to combine the low-resolution feature maps of the decoder network with the high-resolution features of encoder networks. VGG-16 was used as the base layers in their model and a fractionally-strided convolution layers is used to upscale the found low-resolution semantic map which is then combined with high resolution encoding layers. The model as implemented by the present disclosure uses the same intuition for the encoder/decoder network as the FCN architecture. The model/network of the present disclosure, uses a pre-trained VGG-19 layer as the base network. The fully connected layers (layers after pool5) of VGG-19 are replaced with two (1×1) convolution layers. Each of these convolution layers (conv6) uses the ReLU activation followed by a dropout layer having probability of 0.8 (conv6+dropout as shown in FIG. 1). Following this layer, two different branches of the decoder network are appended. This is according to the intuition that the column region is a subset of the table region. Thus, the single encoding network can filter out the active regions with better accuracy using features of both table and column regions. The output of the (conv6+dropout) layer is distributed to both decoder branches. In each branch, additional layers are appended to filter out the respective active regions. In the table branch of the decoder network, an additional (1×1) convolution layer, conv7 table is used, before using a series of fractionally strided convolution layers for upscaling the image. The output of the conv7 table layer is also up-scaled using fractionally strided convolutions, and is appended with the pool4 pooling layer of the same dimension. Similarly, the combined feature map is again up-scaled and the pool3 pooling is appended to it. Finally, the final feature map is upscaled to meet the original image dimension. In the other branch for detecting columns, there is an additional convolution layer (conv7 column) with a ReLU activation function and a dropout layer with the same dropout probability. The feature maps are up-sampled using fractionally strided convolutions after a (1×1) convolution (conv8 column) layer. The up-sampled feature maps are combined with the pool4 pooling layer and the combined feature map is up-sampled and combined with the pool3 pooling layer of the same dimension. After this layer, the feature map is upscaled to the original image. The outputs of the two computational graphs yields the mask for the table and column regions. The overview of the deep learning TableNet architecture is shown in FIG. 2.

Referring now to the drawings, and more particularly to FIGS. 1 through 4G, where similar reference characters denote corresponding features consistently throughout the figures, there are shown preferred embodiments and these embodiments are described in the context of the following exemplary system and/or method.

FIG. 1 an exemplary block diagram of a system 100 for deep learning based table detection and associated data extraction from scanned image documents, in accordance with an embodiment of the present disclosure. The system 100 may also be referred as 'table detection and data extraction system' and may be interchangeably used hereinafter. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises scanned image documents, for example, scanned image document containing text, table(s) and associated text comprised in the table(s), and the like. In an embodiment, the memory 102 may store (or stores) one of more techniques (e.g., OCR technique(s) such as masking technique(s), and the like). The memory 102 further comprises one or more domain rules applied on masked table region to obtain one or more row. The memory 102 further comprises (or may further comprise) information pertaining to input(s)/output(s) of each step performed by the systems and methods of the present disclosure. In other words, input(s) fed at each step and output(s) generated at each step are comprised in the memory 102, and can be utilized in further processing and analysis.

FIG. 2, with reference to FIG. 1, depicts an exemplary deep learning network comprised in the system 100 of FIG. 1 for table detection and associated data extraction from scanned image documents along with a modified dataset, in accordance with an embodiment of the present disclosure. More specifically, on the left side of FIG. 2, sample training image from Marmot dataset is depicted along with highlighted texts. On right side of the FIG. 2, deep learning network architecture is depicted wherein pre-trained layers of VGG-19 are shown. Layers starting from conv1 to pool5 are used as common encoder layers for both table and column graph. Two decoder branches, conv7 column and conv7 table emerging after encoder layers, generate separate table predictions and column predictions.

Figure 3:
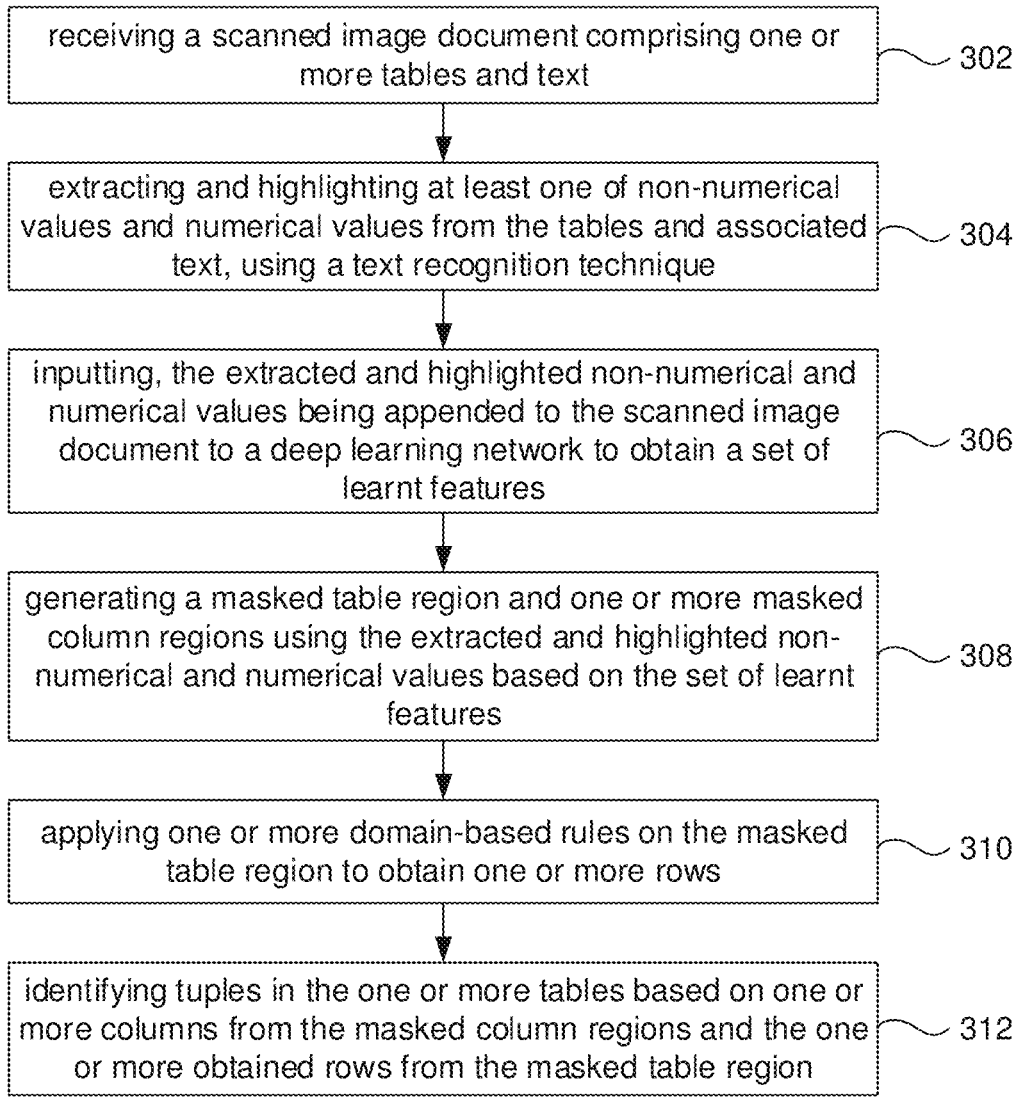
FIG. 3 is an exemplary flow diagram illustrating a method for deep learning based table detection and associated data extraction from scanned image documents using the system of FIGS. 1-2, in accordance with an embodiment of the present disclosure.

FIG. 3, with reference to FIGS. 1-2, is an exemplary flow diagram illustrating a method for deep learning based table detection and associated data extraction from scanned image documents using the system 100 of FIGS. 1-2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the deep learning network architecture of FIG. 2 and the flow diagram of FIG. 3. At step 302 of the present disclosure, the one or more hardware processors 104 receive, via the deep learning network architecture of FIG. 2, a scanned image document comprising one or more tables and text. FIG. 4A, with reference to FIGS. 1 through 3, depicts a sample input scanned image document, in accordance with an embodiment of the present disclosure. At step 304 of the present disclosure, the one or more hardware processors 104 extract and highlight, via the deep learning network architecture, at least one of one or more non-numerical values and one or more numerical values containing image from the one or more tables and associated text, using a text detection and recognition technique (e.g., Tesseract OCR tool as known in the art). In an embodiment, the step of extracting and highlighting at least one of one or more non-numerical values and one or more numerical values from the one or more tables and associated text, using a text detection and recognition technique, is based on identified semantic information using the text from the scanned image document. FIG. 4B, with reference to FIGS. 1 through 4A, depicts detection of words regions using the text recognition technique, wherein text are extracted and highlighted and region is created on basis of text content.

Figure 4C:
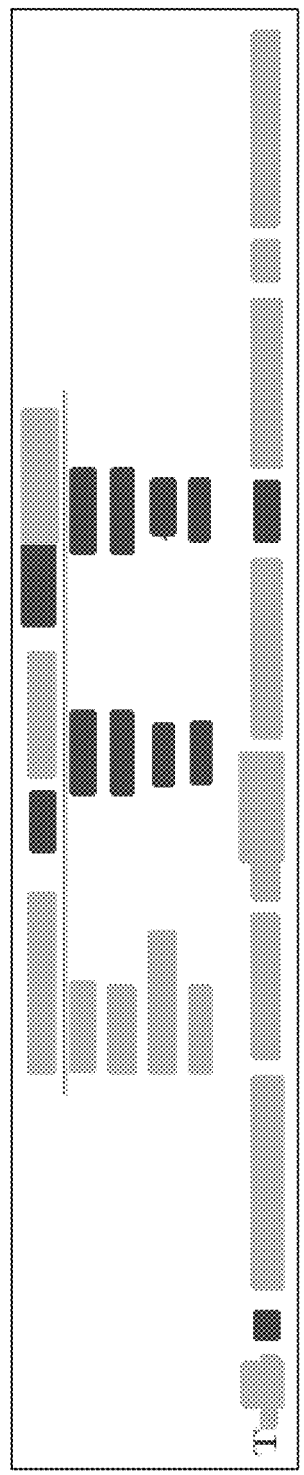
FIG. 4C depicts masked content and/or text in the scanned image document, in accordance with an embodiment of the present disclosure.
Figure 4E:
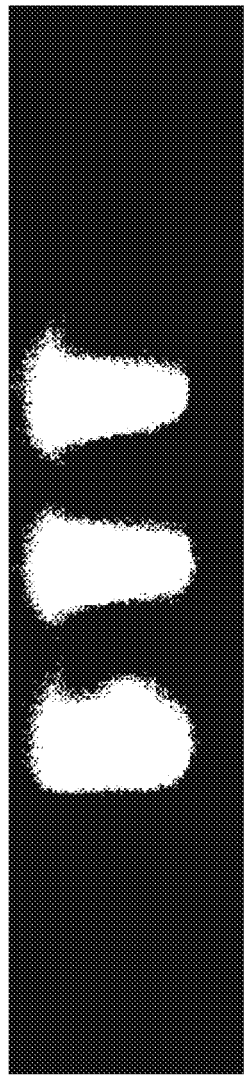
FIG. 4E depicts mask for the column regions in the scanned image document, in accordance with an embodiment of the present disclosure.
Figure 4F:
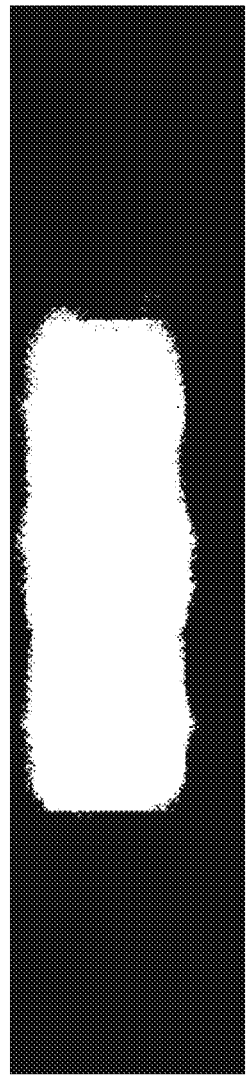
FIG. 4F depicts masked table region comprised in the scanned image document, in accordance with an embodiment of the present disclosure.

At step 306 of the present disclosure, the one or more hardware processors 104 input the extracted and highlighted non-numerical and numerical values to the deep learning network of FIG. 2 to obtain a set of learnt features. FIG. 4C depicts masked content and/or text in the scanned image document, in accordance with an embodiment of the present disclosure. FIG. 4D depicts a modified dataset, with masked content appended to the modified dataset, in accordance with an embodiment of the present disclosure. More specifically, the modified dataset with masked content appended to it as shown in FIG. 4D is fed as an input to the deep learning network of FIG. 2. In other words, the dataset as shown in FIG. 4A is overlaid with the masked content. Alternatively, the masked content is overlaid with the dataset of FIG. 4A wherein the overlaid representation is depicted in FIG. 4D. At step 308 of the present disclosure, the one or more hardware processors 104 generate a masked table region and one or more masked column regions using the set of learnt features. FIG. 4E, with reference to FIGS. 1 through 4D, depicts mask for the column regions in the scanned image document, in accordance with an embodiment of the present disclosure. FIG. 4F, with reference to FIGS. 1 through 4E, depicts masked table region comprised in the scanned image document, in accordance with an embodiment of the present disclosure. More specifically, the trained deep learning network architecture or trained deep learning model is executed on the above modified image, to obtain two output: (i) mask for the column regions in an image (also referred as scanned image document and interchangeably used hereinafter) and (ii) mask for the table region in image as depicted in FIG. 4F. In other words, the masked table region and the one or more masked column regions are generated to determine boundary of the one or more columns and the one or more tables comprised in the scanned image document. Extracting the proper boundary using the word boundaries and above masks gives (i) 3 boxes representing columns, and (ii) 1 large box representing table. FIG. 4G, with reference to FIGS. 1 through 4F, depicts boundary of columns and table(s) comprised in the input scanned image document in accordance with an embodiment of the present disclosure.

At step 310 of the present disclosure, the one or more hardware processors 104 apply one or more domain-based rules on the masked table region to obtain one or more rows. In a nutshell, steps 302 till 310 are described as below for better understanding of the embodiments of the present disclosure. After processing the scanned image document from the deep learning network of FIG. 2, masks for table and column regions are generated as mentioned in step 308. These masks are used to filter out the table and its column regions from the image. Since, all word positions of the document are already known (using Tesseract OCR), only the word patches lying inside table and column regions are filtered out. Now, using these filtered words, a row can be defined as the collection of words from multiple columns, which are at the similar horizontal level. However, a row is not necessarily confined to a single line, and depending upon the content of a column or line demarcations, a row can span multiple lines. Therefore, to cover the different possibilities, the systems and methods of the present disclosure apply various domain rules for row segmentation as depicted below, and these rules shall not be construed as limiting the scope of the present disclosure:

1. In most tables for which line demarcations are present, the lines segment the rows in each column. To detect the possible line demarcation (for rows), every space between two vertically placed words in a column is tested for the presence of lines via a Radon transform (as known in the art). The presence of horizontal line demarcation clearly segments out the row.
2. In case a row spans multiple lines, the rows of the table which have maximum non-blank entries are marked as the starting point for a new row. For example in a multicolumn table, some of the columns can have entries spanning just one line (like quantity, etc.), while others can have multi-line entries (like description, etc.). Thus, each new row begins when all the entities in each column are filled.
3. In tables, where all the columns are completely filled and there are no line demarcations, each line (level) can be seen as a unique row.

At step 312 of the present disclosure, the one or more hardware processors 104 identify tuples in the one or more tables based on one or more columns from the masked column regions and the one or more obtained rows from the masked table region. Below table depicts tuples identified in the one or more tables based on one or more columns from the masked column regions and the one or more obtained rows from the masked table region, in accordance with an embodiment of the present disclosure. More specifically, words are arranged on basis of spatial positions to different columns and inside table. It is to be understood by a person having ordinary skill in the art that texts are pre-filtered with table bounds and then it is filtered in respective columns. While traversing each rows, in each column, text regions are traversed in top-bottom and left to right approach. wherein data is converted into table comprising rows and columns. Below is an example of the tuples identified in the table 1 wherein data is converted into table comprising rows and columns.

| Heuristics | 250 clauses | 300 clauses |
|---|---|---|
| None | 9204 | 2583 |
| Over | 8542 | 2388 |
| Positive | 302 | 429 |
| Both | 303 | 424 |

Below description provides explanation on dataset preparation, preparing semantic information (as depicted in step 304), and training Data Preparation for the deep learning network of FIG. 2.

Dataset Preparation:

Deep-learning based approaches are data-intensive and require large volumes of training data for learning effective representations. There are very few datasets for example, but not limited to, Marmot (e.g., refer 'J. Fang, X. Tao, Z. Tang, R. Qiu, and Y. Liu, "Dataset, ground-truth and performance metrics for table detection evaluation," in 2012 10th IAPR International Workshop on Document Analysis Systems, March 2012, pp. 445-449.'), UW3 (e.g., refer 'I. Guyon, R. M. Haralick, J. J. Hull, and I. T. Phillips, "Data sets for OCR and document image understanding research," in In Proceedings of the SPIE-Document Recognition IV. World Scientific, 1997, pp. 779-799.'), etc. for table detection and even these contain only a few hundred images. There are even fewer datasets for table structure identification such as the (International Conference on Document Analysis and Recognition) ICDAR 2013 table competition dataset for both table detection and its structural analysis (e.g., refer 'M. G¨obel, T. Hassan, E. Oro, and G. Orsi, "Icdar 2013 table competition," in Document Analysis and Recognition (ICDAR), 2013 $12^{th}$ International Conference on. IEEE, 2013, pp. 1449-1453.'). This creates a constraint for deep learning models to solve both table detection & table structural analysis.

For training the deep learning network of FIG. 2, the present disclosure has used the Marmot table recognition dataset. This is the largest publicly available dataset for table detection but did not have annotations for table columns or rows. Dataset has been (manually) annotated for table structure recognition since the dataset had ground truth only for table detection. The dataset was (manually) annotated by labeling the bounding boxes around each of the columns inside the tabular region. The manually annotated modified dataset is publicly released with the name Marmot Extended for table structure recognition.

Providing Semantic Information:

Intuitively, any table has common data types in the same row/column depending on whether the table is in row major or column major form. For example, a name column contains strings, while, a quantity header contains numbers. To provide this semantic information to the deep model (or deep learning network of FIG. 2), text regions with similar data types are coded (e.g., color coded). This modified image is then fed to network resulting in improved performance.

System and methods of the present included spatial semantic features by highlighting the words with patches as shown in FIG. 2 this dataset is also made publicly available. The document images are first processed with histogram equalization. After pre-processing, the word blocks are extracted using tesseract OCR. These word patches are colored (not shown in FIGS.) depending upon their basic datatype. The resulting modified images are used as input to the network. The deep learning network of FIG. 2 takes the input image and generates the binary mask image of both table and columns separately. The achieved result is filtered using rules outlined on the basis of the detected table and column masks. An example of the generated output are shown in FIGS. 4C through 4E as indicated in step 308.

Training Data Preparation for Deep Learning Network (FIG. 2):

To provide the basic semantic type information to the model/the deep learning network, the word patches are (color) coded. The image is first processed with tesseract OCR, to get all word patches in the image document. Then the words are processed via regular expressions to determine their data-type. The intuition is to color the word bounding boxes to impart both the semantic and spatial information to the network. Each datatype is given a unique color (not shown in FIGS.) and, bounding-boxes of words with similar datatypes are shaded in the same color (not shown in FIGS.). Word bounding boxes are filtered out to remove the spurious detections. However, since word detection and extraction from the present OCR cannot be accurate in detecting all words, the model/the deep learning network needs to learn these cases. Therefore to simulate the case of incomplete word detection in the training image, few randomly selected word patches are dropped deliberately. The formed color coded image (not shown in FIGS.) can be used for training, but a lot of relevant information are dropped in the process. Many visual features for example, line demarcations, corners, color highlights, etc. are lost, while using only the word annotated document image. Therefore, to retain those important visual features in the training data, the word highlight image is pixel-wise added to the original image. This modified document images are used for training.

Experiments and Results

The experiments and results section describe different experiments performed on the ICDAR 2013 table competition dataset (e.g., refer 'M. G¨obel, T. Hassan, E. Oro, and G. Orsi, "Icdar 2013 table competition," in Document Analysis and Recognition (ICDAR), 2013 12$^{th}$ International Conference on. IEEE, 2013, pp. 1449-1453.') and the model performance is evaluated based on the Recall, Precision & F1-score. These measures are computed for each document and their average is taken across all the documents.

a) Table Detection: Completeness and Purity are the two standard measures used in page segmentation (e.g., refer 'A. C. e Silva, "Metrics for evaluating performance in document analysis: application to tables," International Journal on Document Analysis and Recognition (IJDAR), vol. 14, no. 1, pp. 101-109, 2011.').

b) A region is complete if it includes all sub-objects present in the ground-truth. A region is pure if it does not include any sub-objects which are not in the ground-truth. Sub-objects are created by dividing the given region into meaningful parts like heading of a table, body of a table etc. But these measures does not discriminate between minor error and major error. So, individual characters in each region are made as sub-objects. Precision and recall measures are calculated on these sub-objects in each region and the average is taken across all the regions in a given document.

c) Table Data Extraction: Each entry inside (or comprised in) a table is defined as cell. For each cell, adjacency relations are generated with its nearest horizontal and vertical neighbors (or neighbours). Thus, adjacency relation of a given cell is a 1D-tuple containing text information of its neighboring cells. The content in each cell is normalized; whitespace was removed, special characters was replaced with underscore and lowercase letters with uppercase. This 1D-tuple can be compared with ground truth by using precision and recall. Recall measures.

The deep learning network of FIG. 2 requires both table and structure annotated data for training. The present disclosure and its systems and methods used the Marmot table detection data and manually annotated the structure information. There were a total of 1016 documents containing tables including both Chinese and English documents, out of which 509 English documents were annotated and used for training. In Experiment 1, the deep learning network of FIG. 2 was trained on all positive samples of Marmot and tested on ICDAR 2013 table dataset for both table and structure detection. There are two computation graphs which require training. Each training sample is a tuple of a document image, table mask and column mask. With each training tuple, the two graphs are computed at-least twice. In the initial phase of training, the table branch and column branch were computed in the ratio of 2:1. With each training tuple, the table branch of the computational graph was computed twice, and then the column branch of the deep learning network was computed. It is worth noting that, although the table branch and column branch are different, the encoder is the same for both. During initial iterations of training, the learning is more focused on training the model to generate big active tabular regions that on subsequent training specializes to column regions. After around 500 iterations with a batch size of 2, when training loss of both table and column are comparable and close, this training scheme is modified. However, it should be noted by a person having ordinary skill in the art, that the table classifier at this stage must exhibit a converging trend, otherwise, the training is extended with the same 2:1 scheme. The deep learning network of FIG. 2 is then trained in the ratio of 1:1 for both branches until convergence. Using the same training pattern, the model (also referred as deep learning network of FIG. 2 or TableNet and interchangeably used hereinafter) was trained for 5000 iterations with a batch size of 2 and learning rate of 0.0001. Adam optimizer was used for improving and optimizing training with parameters beta1=0.9, beta2=0.999 and epsilon=1e-08. The convergence and over-fitting behavior was monitored by observing the performance over the validation set (taken from ICDAR 2013 dataset). During testing, 0.99 was taken as the threshold probability for pixel-wise prediction. The results have been compiled in Table 2 and table 3 as depicted below. More specifically, Table 2 depicts results on Table Detection and shall not be construed as limiting the scope of the present disclosure.

TABLE 1

| Model | Recall | Precision | F1-Score |
|---|---|---|---|
| TableNet + Semantic Features (fine-tuned on ICDAR) | 0.9628 | 0.9697 | 0.9662 |
| TableNet + Semantic Features | 0.9621 | 0.9547 | 0.9583 |
| TableNet | 0.9501 | 0.9547 | 0.9547 |
| DeepDeSRT | 0.9615 | 0.9740 | 0.9677 |
| Tran et al. | 0.9636 | 0.9521 | 0.9578 |

Table 3 depicts results on Table Structure Recognition and Data Extraction as shown below:

TABLE 2

| Model | Recall | Precision | F1-Score |
|---|---|---|---|
| TableNet + Semantic Features (fine-tuned on ICDAR) | 0.9001 | 0.9307 | 0.9151 |
| TableNet + Semantic Features | 0.8994 | 0.9255 | 0.9122 |
| TableNet | 0.8987 | 0.9215 | 0.9098 |
| DeepDeSRT | 0.8736 | 0.9593 | 0.9144 |

Similarly, in another experiment, the present disclosure and its systems and methods used the modified Marmot dataset where, the words in each documents were highlighted to provide semantic context as explained in earlier description sections. All the parameters were identical to earlier experiment. There was slight improvement in the results, when these spatial, semantic information are appended to the image in visual forms (see table for comparison). Output of the model is shown in FIGS. 4E through 4F. Additionally, yet another experiment was carried out to generate the result so that it can be compared with the closest deep-learning based solution, DeepDSert (e.g., refer 'S. Schreiber, S. Agne, I. Wolf, A. Dengel, and S. Ahmed, "Deepdesrt: Deep learning for detection and structure recognition of tables in document images," in Document Analysis and Recognition (ICDAR), 2017 14th IAPR International Conference on, vol. 1. IEEE, 2017, pp. 1162-1167.'). In DeepDSert, separate models were made for each task, which was trained on different datasets such as MarmotC for table detection, and ICDAR 2013 table dataset for table structure recognition. To generate the comparable result, the present disclosure and its systems and methdos fine-tuned the Marmot trained model, on ICDAR train and test data split. As done in DeepDSert, 34 images were randomly chosen for testing and rest of data images for fine-tuning the model of the present disclosure. The model/deep learning network of FIG. 2 was fine-tuned, with same parameters as in original, in the ratio of 1:1 for both branches for 3000 iterations with batch size 2. The performance of the model of the present disclosure further improved after the fine-tuning, possibly due to the introduction to the domain of ICDAR documents. The results of this experiment are also compiled in Tables 2 and 3 as depicted above.

Embodiments of the present disclosure implement an end-to-end model for jointly performing both table detection and structure recognition in an end-to-end fashion. Existing approaches for information extraction treat them as two separate tasks and approach the problem with different models. The present disclosure and its systems and methods jointly address both tasks simultaneously, by exploiting the inherent interdependence between table detection and table structure identification. The model of the present disclosure utilizes the knowledge from previously learned tasks wherein this information or knowledge can be transferred to newer, related ones demonstrating transfer learning. This is particularly useful when the test data is sparse. Through experiments and results, the present disclosure also shows that by highlighting the text based to provide data-type information improve the performance of the model.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   receiving, via one or more hardware processors, a scanned image document comprising one or more tables and text;
   extracting and highlighting, via the one or more hardware processors, at least one of one or more non-numerical values and one or more numerical values from the one or more tables and associated text, using a text recognition technique;
   inputting, via the one or more hardware processors, the extracted and highlighted non-numerical and numerical values being appended to the scanned image document, to a deep learning network to obtain a set of learnt features;
   generating, via the one or more hardware processors, a masked table region and one or more masked column regions using the extracted and highlighted non-numerical and numerical values based on the set of learnt features;
   applying, via the one or more hardware processors, one or more domain-based rules on the masked table region to obtain one or more rows; and
   identifying, via the one or more hardware processors, tuples in the one or more tables based on one or more columns from the masked column regions and the one or more obtained rows from the masked table region.

2. The processor implemented method of claim 1, wherein the step of extracting and highlighting at least one of one or more non-numerical values and one or more numerical values from the one or more tables and associated text, using a text detection and recognition technique, is based on identified semantic information using the text from the scanned image document.

3. The processor implemented method of claim 1, wherein the masked table region and the one or more masked column regions are generated to determine boundary of the one or more columns and the one or more tables comprised in the scanned image document.

4. The processor implemented method of claim 1, wherein the step of identifying tuples in the one or more tables is based on an intersection of the one or more columns from the masked column regions and the one or more obtained rows in the masked table region.

5. A system, comprising:
   a memory storing instructions;
   one or more communication interfaces; and
   one or more hardware processors coupled to the memory via the one or more communication interfaces, wherein the one or more hardware processors are configured by the instructions to:
   receive, via one or more hardware processors, a scanned image document comprising one or more tables and text;
   extract and highlight, via the one or more hardware processors, at least one of one or more non-numerical values and one or more numerical values from the one or more tables and associated text, using a text recognition technique;
   input, via the one or more hardware processors, the extracted and highlighted non-numerical and numerical values being appended to the scanned image document, to a deep learning network comprised in the system to obtain a set of learnt features;
   generate, via the one or more hardware processors, a masked table region and one or more masked column regions using the extracted and highlighted non-numerical and numerical values based on the set of learnt features;
   apply, via the one or more hardware processors, one or more domain-based rules on the masked table region to obtain one or more rows; and
   identify, via the one or more hardware processors, tuples in the one or more tables based on one or more columns from the masked column regions and the one or more obtained rows from the masked table region.

6. The system of claim 5, wherein at least one of one or more non-numerical values and one or more numerical values extracted and highlighted from the one or more tables and associated text, using the text detection and recognition technique, is based on identified semantic information using the text from the scanned image document.

7. The system of claim 5, wherein the masked table region and the one or more masked column regions are generated to determine boundary of the one or more columns and the one or more tables comprised in the scanned image document.

8. The system of claim 5, wherein the tuples are identified in the one or more tables based on an intersection of the one or more columns from the masked column regions and the one or more obtained rows in the masked table region.

9. One or more non-transitory machine readable information storage mediums comprising one or more instructions which when executed by one or more hardware processors cause deep learning based table detection and associated data extraction from scanned image documents by:
   receiving, via the one or more hardware processors, a scanned image document comprising one or more tables and text;
   extracting and highlighting, via the one or more hardware processors, at least one of one or more non-numerical values and one or more numerical values from the one or more tables and associated text, using a text detection and recognition technique;
   inputting, via the one or more hardware processors, the extracted and highlighted non-numerical and numerical values to the deep learning network to obtain a set of learnt features;
   generating, via the one or more hardware processors, a masked table region and one or more masked column regions using the set of learnt features;
   applying, via the one or more hardware processors, one or more domain-based rules on the masked table region to obtain one or more rows; and
   identifying, via the one or more hardware processors, tuples in the one or more tables based on one or more columns from the masked column regions and the one or more obtained rows from the masked table region.

10. The one or more non-transitory machine readable information storage mediums of claim 9, the step of extracting and highlighting at least one of one or more non-numerical values and one or more numerical values from the one or more tables and associated text, using a text detection and recognition technique, is based on identified semantic information using the text from the scanned image document.

11. The one or more non-transitory machine readable information storage mediums of claim 9, wherein the masked table region and the one or more masked column regions are generated to determine boundary of the one or more columns and the one or more tables comprised in the scanned image document.

12. The one or more non-transitory machine readable information storage mediums of claim 9, wherein the step of identifying tuples in the one or more tables is based on an intersection of the one or more columns from the masked column regions and the one or more obtained rows in the masked table region.

\* \* \* \* \*